United States Patent
Ackerman (10) Patent No.: US 11,695,647 B1
(45) Date of Patent: Jul. 4, 2023

(54) IMPLEMENTING A MACHINE-LEARNING MODEL TO IDENTIFY CRITICAL SYSTEMS IN AN ENTERPRISE ENVIRONMENT

(71) Applicant: SOPHOS LIMITED, Abingdon (GB)

(72) Inventor: Karl Ackerman, Topsfield, MA (US)

(73) Assignee: Sophos Limited, Oxfordshire (GB)

( * ) Notice: Subject to any disclaimer, the term of this patent is extended or adjusted under 35 U.S.C. 154(b) by 0 days.

(21) Appl. No.: 17/710,842

(22) Filed: Mar. 31, 2022

(51) Int. Cl.
H04L 41/16 (2022.01)
H04L 43/12 (2022.01)
H04L 41/14 (2022.01)

(52) U.S. Cl.
CPC ............ *H04L 41/16* (2013.01); *H04L 41/145* (2013.01); *H04L 43/12* (2013.01)

(58) Field of Classification Search
CPC ........ H04L 41/16; H04L 41/145; H04L 43/12
See application file for complete search history.

(56) References Cited

U.S. PATENT DOCUMENTS

| | | | | |
|---|---|---|---|---|
| 2013/0204992 A1* | 8/2013 | Kiris | ..................... | H04L 67/535 709/223 |
| 2020/0043485 A1* | 2/2020 | Tonetti | ..................... | G10L 15/22 |
| 2020/0083973 A1* | 3/2020 | Beckett, III | ......... | H04H 60/377 |
| 2020/0137097 A1* | 4/2020 | Zimmermann | ..... | G06F 21/6218 |
| 2020/0159841 A1* | 5/2020 | Tabares | ............... | G06F 16/1805 |
| 2021/0255898 A1* | 8/2021 | Konti | .................... | G06F 11/004 |

* cited by examiner

*Primary Examiner* — John A Follansbee
*Assistant Examiner* — Fadi Haj Said
(74) *Attorney, Agent, or Firm* — IP Spring (57) ABSTRACT

A computer-implemented method includes training a machine-learning model, using a training dataset that distinguishes between critical systems and non-critical systems, to classify a particular computer system as critical or non-critical, wherein a label is applied to the particular computer system during the training that identifies the particular computer system as critical or non-critical, and wherein parameters that describe the critical systems or non-critical systems are used as features during the training. The method further includes receiving an input dataset that describes a plurality of computer systems in the enterprise environment. The method further includes outputting, using the trained machine-learning model, an identification of one or more critical systems of the plurality of computer systems within the enterprise environment and an identification of one or more non-critical systems of the plurality of computer systems within the enterprise environment, wherein each identification is associated with a confidence level.

20 Claims, 7 Drawing Sheets

400 obtain a training dataset with parameters that distinguish between critical systems and non-critical systems 402 where the training data set describes training computer systems that include a set of training critical systems and a set of training non-critical systems, and no computer system is in both sets where the parameters include one or more of:
- network exposure
- a type of data stored in one or more systems of the set of critical systems and one or more systems of the set of non-critical systems
- information about users that have access to the set of critical systems and the set of non-critical systems
- files stored in the set of critical systems and the set of non-critical systems train a machine-learning model, using the training dataset, to classify a particular computer system as critical or non-critical, 404 where a label is applied to the particular computer system during the training that identifies the particular computer system as critical or non-critical where the parameters that describe the critical systems or non-critical systems are used as features during the training

Identify an initial category for a parameter 406

Revise the trained machine-learning model based on feedback about the initial category for the parameter 408

Provide, to an administrator for review, an identification of one or more critical systems of computer systems within an enterprise environment and an identification of one or more non-critical systems of the computer systems within the enterprise environment 602

Receive feedback that includes a reclassification of the one or more non-critical systems to a reclassified critical system 604

Update a trained machine-learning model based on the feedback 606

Generate, using one or more sensors, an indication of a change to at least one parameter of one of the computer systems in an enterprise environment 702 where the sensors include one or more of:
- an integrated sensor
- a hardware-based sensor
- a software-based sensor
- a firewall
- a Data Loss Prevention (DLP) scan

Provide the changed at least one parameter to a trained machine-learning model 704

Reclassify a non-critical system in the enterprise environment to a critical system 706

FIG 7

IMPLEMENTING A MACHINE-LEARNING MODEL TO IDENTIFY CRITICAL SYSTEMS IN AN ENTERPRISE ENVIRONMENT

FIELD

Embodiments relate generally to a machine-learning model to identify critical systems. More particularly, embodiments relate to methods, systems, and computer readable media that train a machine-learning model to output an identification of critical systems and non-critical system within an enterprise environment.

BACKGROUND

An enterprise environment may include a variety of computer systems. Some of the computer systems may be more critical than other computer systems. For example, a printer that is on an internal network is less critical than a desktop computer that is used by the president of a corporation. The criticality of the computer systems is typically based on rigid rules or manually tagged by an administrator. However, the criticality may change depending on different factors. Predicting the criticality of the systems is difficult because factors that affect the criticality of a computer system frequently changes.

The background description provided herein is for the purpose of presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A computer-implemented method includes training a machine-learning model, using a training dataset that distinguishes between critical systems and non-critical systems, to classify a particular computer system as critical or non-critical, where a label is applied to the particular computer system during the training that identifies the particular computer system as critical or non-critical, and where parameters that describe the critical systems or non-critical systems are used as features during the training. The method further includes receiving an input dataset that describes a plurality of computer systems in the enterprise environment. The method further includes outputting, using the trained machine-learning model, an identification of one or more critical systems of the plurality of computer systems within the enterprise environment and an identification of one or more non-critical systems of the plurality of computer systems within the enterprise environment, where each identification is associated with a confidence level.

In some embodiments, the method further includes prior to training the machine-learning model, obtaining the training dataset with parameters that describe training computer systems that include a set of training critical systems and a set of training non-critical systems, wherein no computer system is in both sets, the parameters include network exposure and one or more of: a type of data stored in one or more systems of the set of training critical systems and one or more systems of the set of training non-critical systems, information about users that have access to the set of training critical systems and the set of training non-critical systems, or files stored in the set of training critical systems and the set of training non-critical systems. In some embodiments, the training is performed using supervised learning and the supervised learning includes applying a category to the parameters in the training dataset. In some embodiments, the method further includes receiving feedback that includes a reclassification of the one or more non-critical systems to a reclassified critical system and updating the trained machine-learning model based on the feedback. In some embodiments, responsive to receiving the feedback, determining whether the confidence level associated with the reclassified critical system exceeds a threshold level and responsive to the confidence level exceeding the threshold level, generating a notification to an administrator that provided the feedback that includes the confidence level and requesting confirmation of the reclassified critical system of the one or more non-critical systems. In some embodiments, responsive to receiving the confirmation, assigning a weight to the feedback to adjust an effect of the feedback. In some embodiments, the method further includes receiving, from a first administrator, first feedback that includes a reclassification of the one or more non-critical systems to a reclassified critical system and determining a reliability of the first feedback based on a level of match between the first feedback and a plurality of other feedback. In some embodiments, the method further includes generating, using one or more sensors, an indication of a change to at least one parameter of the plurality of computer systems in the enterprise environment and upon generating the indication, reclassifying the one or more non-critical systems to a reclassified critical system by providing the changed at least one parameter to the trained machine-learning model. In some embodiments, the sensors include one or more of an integrated sensor, a hardware-based sensor, a software-based sensor, a firewall, or a Data Loss Prevention (DLP) scan. In some embodiments, network exposure is based on whether a corresponding system has communicated with a public network. In some embodiments, the method further comprises determining, based on an access control database, a job function of user accounts that have access to systems, wherein the job function is a parameter for the trained machine-learning model and generating, with the trained machine-learning model, clusters based on the job function, where the identification of the one or more critical systems is based on the clusters. In some embodiments, the input dataset includes one or more of a change to a network exposure, a change to a type of data stored in the enterprise environment, or a change to a user that has access to the enterprise environment.

A system comprises one or more processors and one or more computer-readable media, having instructions stored thereon that, when executed by the one or more processors, cause the one or more processors to perform operations comprising: training a machine-learning model, using a training dataset that distinguishes between critical systems and non-critical systems, to classify a particular computer system as critical or non-critical, where a label is applied to the particular computer system during the training that identifies the particular computer system as critical or non-critical, and where parameters that describe the critical systems or non-critical systems are used as features during the training; receiving an input dataset that describes a plurality of computer systems in the enterprise environment; and outputting, using the trained machine-learning model, an identification of one or more critical systems of the plurality of computer systems within the enterprise environment and an identification of one or more non-critical systems of the plurality of computer systems within the enterprise environment, where each identification is associated with a confidence level.

In some embodiments, the operations further include prior to training the machine-learning model, obtaining the training dataset with parameters that describe training computer systems that include a set of training critical systems and a set of training non-critical systems, wherein no computer system is in both sets, the parameters include network exposure and one or more of: a type of data stored in one or more systems of the set of training critical systems and one or more systems of the set of training non-critical systems, information about users that have access to the set of training critical systems and the set of training non-critical systems, or files stored in the set of training critical systems and the set of training non-critical systems. In some embodiments, the training is performed using supervised learning and the supervised learning includes applying a category to the parameters in the training dataset.

A computer-program product that includes one or more non-transitory computer-readable media with instructions stored thereon that, when executed by one or more computers, cause the one or more computers to perform operations comprising: training a machine-learning model, using a training dataset that distinguishes between critical systems and non-critical systems, to classify a particular computer system as critical or non-critical, where a label is applied to the particular computer system during the training that identifies the particular computer system as critical or non-critical, and where parameters that describe the critical systems or non-critical systems are used as features during the training; receiving an input dataset that describes a plurality of computer systems in the enterprise environment; and outputting, using the trained machine-learning model, an identification of one or more critical systems of the plurality of computer systems within the enterprise environment and an identification of one or more non-critical systems of the plurality of computer systems within the enterprise environment, where each identification is associated with a confidence level.

In some embodiments, the operations further include prior to training the machine-learning model, obtaining the training dataset with parameters that describe training computer systems that include a set of training critical systems and a set of training non-critical systems, wherein no computer system is in both sets, the parameters include network exposure and one or more of: a type of data stored in one or more systems of the set of training critical systems and one or more systems of the set of training non-critical systems, information about users that have access to the set of training critical systems and the set of training non-critical systems, or files stored in the set of training critical systems and the set of training non-critical systems. In some embodiments, the training is performed using supervised learning and the supervised learning includes applying a category to the parameters in the training dataset. In some embodiments, the operations further include receiving feedback that includes a reclassification of the one or more non-critical systems to a reclassified critical system and updating the trained machine-learning model based on the feedback. In some embodiments, the operations further include responsive to receiving the feedback, determining whether the confidence level associated with the reclassified critical system exceeds a threshold level and responsive to the confidence level exceeding the threshold level, generating a notification to an administrator that provided the feedback that includes the confidence level and requesting confirmation of the reclassified critical system of the one or more non-critical systems.

DETAILED DESCRIPTION

Network Environment 100

Figure 1:
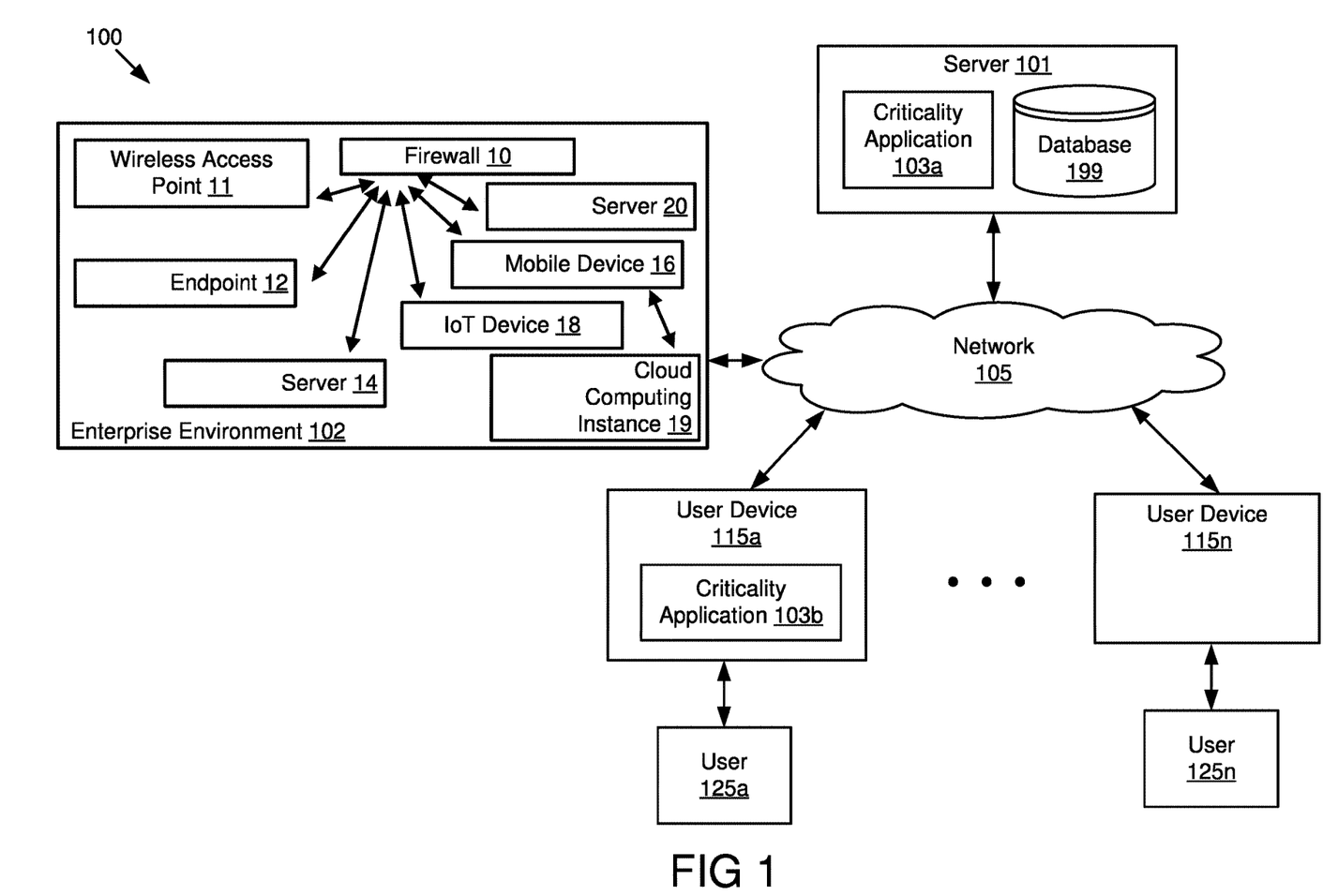
FIG. 1 is a block diagram of an example network environment, according to some embodiments described herein.

FIG. 1 illustrates a block diagram of an example network environment 100. In some embodiments, the network environment 100 includes an enterprise environment 102, a server 101, user devices 115a, 115n, and a network 105. Users 125a, 115n may be associated with the user devices 115a, 115n. In some embodiments, the network environment 100 may include other servers or devices not shown in FIG. 1. For example, server 101 may be multiple servers 101.

In FIG. 1 and the remaining figures, a letter after a reference number, e.g., "115a," represents a reference to the element having that particular reference number. A reference number in the text without a following letter, e.g., "115," represents a general reference to embodiments of the element bearing that reference number.

An example enterprise environment 102 may include any networked computer-based infrastructure. For example, the enterprise environment 102 may be corporate, commercial, organizational, educational, governmental, or the like. As home networks can also include more compute instances at home and in the cloud, an enterprise environment 102 may also or instead include a personal network such as a home or a group of homes. The enterprise facility's 102 computer network may be distributed amongst a plurality of physical premises such as buildings on a campus and be located in one or in a plurality of geographical locations. The configuration of the enterprise facility is shown as one example, and it will be understood that there may be any number of compute instances, less or more of each type of compute instances, and other types of compute instances. For example, information about a first enterprise environment 102 may be used by the criticality application 103a as training data and information about a second enterprise environment 102 may be used as input data to a machine-learning model that outputs an identification of critical systems and non-critical systems within the second enterprise environment 102.

The enterprise environment 102 includes different types of computer systems. For example, as shown, the example enterprise environment 102 includes a firewall 10, a wireless access point 11, an endpoint 12, a server 14, a mobile device 16, an appliance or Internet-of-Things (IoT) device 18, a cloud computing instance 19, and a server 20. One or more of the computer systems 10-20 may be implemented in hardware (e.g., a hardware firewall, a hardware wireless access point, a hardware mobile device, a hardware IoT device, a hardware etc.) or in software (e.g., a virtual machine configured as a server or firewall or mobile device). While FIG. 1 shows various elements 10-20, these are for example only and there may be any number or types of elements in a given enterprise environment 102. For example, in addition to the elements depicted in the enterprise environment 102, there may be one or more gateways, bridges, wired networks, wireless networks, virtual private networks, virtual machines or compute instances, computers, printers, and so on.

In some embodiments, the enterprise environment 102 is coupled to the network 105 and transmits information about the enterprise environment 102 to the criticality application 103. For example, the criticality application 103 may use the information from the enterprise environment 102 as part of a training dataset. In another example, the criticality application 103 may identify critical systems and non-critical systems in the enterprise environment 102 based on input provided to a machine-learning model generated by the criticality application 103.

The server 101 includes a processor, a memory, and network communication hardware. In some embodiments, the server 101 is a hardware server. While FIG. 1 illustrates one server 101, the disclosure applies to a system architecture having one or more servers 101. The server 101 is communicatively coupled to the network 105. In some embodiments, the server 101 sends and receives data to and from the user devices 115a, 115n via the network 105. The server 101 may include a criticality application 103a and a database 199.

In some embodiments, the criticality application 103a trains a machine-learning model to classify a computer system as critical or non-critical, receives an input dataset about an enterprise environment 102, and outputs an identification of one or more critical systems within the enterprise environment 102 and an identification of one or more non-critical systems within the enterprise environment 102. The criticality application 103a may receive feedback that includes a reclassification of one of the non-critical systems or one of the critical systems and updates the machine-learning model based on the feedback. The criticality application 103a may modify assignments to different administrators for reviewing the identifications of critical systems and non-critical systems based on feedback provided by the administrators. For example, if an administrator consistently recommends reclassification of a system that the other administrators do not reclassify, the criticality application 103a may exclude the administrator from reviewing the identifications of critical systems and non-critical systems.

In some embodiments, the criticality application 103a is implemented using hardware including a central processing unit (CPU), a field-programmable gate array (FPGA), an application-specific integrated circuit (ASIC), any other type of processor, or a combination thereof. In some embodiments, the criticality application 103a is implemented using a combination of hardware and software. In some embodiments, a user accesses the criticality application 103a via a browser.

The database 199 may be a non-transitory computer readable memory (e.g., random access memory), a cache, a database system, or another type of component or device capable of storing data. The database 199 may store data associated with the criticality application 103, such as training data, enterprise environment 102 information, user feedback, sensor data, administrator assignments and resulting feedback, etc. In some embodiments, the database 199 stores labels (e.g., criticality annotations) associated with computer systems in an enterprise environment 102.

The user device 115 may be a computing device that includes a memory and a hardware processor. For example, the user device 115 may include a desktop computer, a laptop computer, a tablet computer, a mobile device, a smartphone, a wearable device, a reader device, or another electronic device capable of accessing a network 105.

In some embodiments, the user device 115a includes a criticality application 103b with code and routines operable to output an identification of the critical systems within the enterprise environment 102 and an identification of non-critical systems. In some embodiments, the functions of the criticality application 103 are divided between the criticality application 103a stored on the server 101 and the criticality application 103b stored on the user device 115. For example, the criticality application 103a stored on the server 101 may train the machine-learning model and output the identification of the critical systems within the enterprise environment and an identification of non-critical systems. The criticality application 103b stored on the user device 115a may display the identifications to a user 125a (e.g., an administrator) and receive feedback about the identifications that is then evaluated by the criticality application 103a stored on the server 101.

In the illustrated embodiment, the entities of the environment 100 are communicatively coupled via a network 105. The network 105 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof. Although FIG. 1 illustrates one network 105 coupled to the user devices 115 and the server 101, in practice one or more networks 105 may be coupled to these entities.

Computing Device 200 Example

Figure 2:
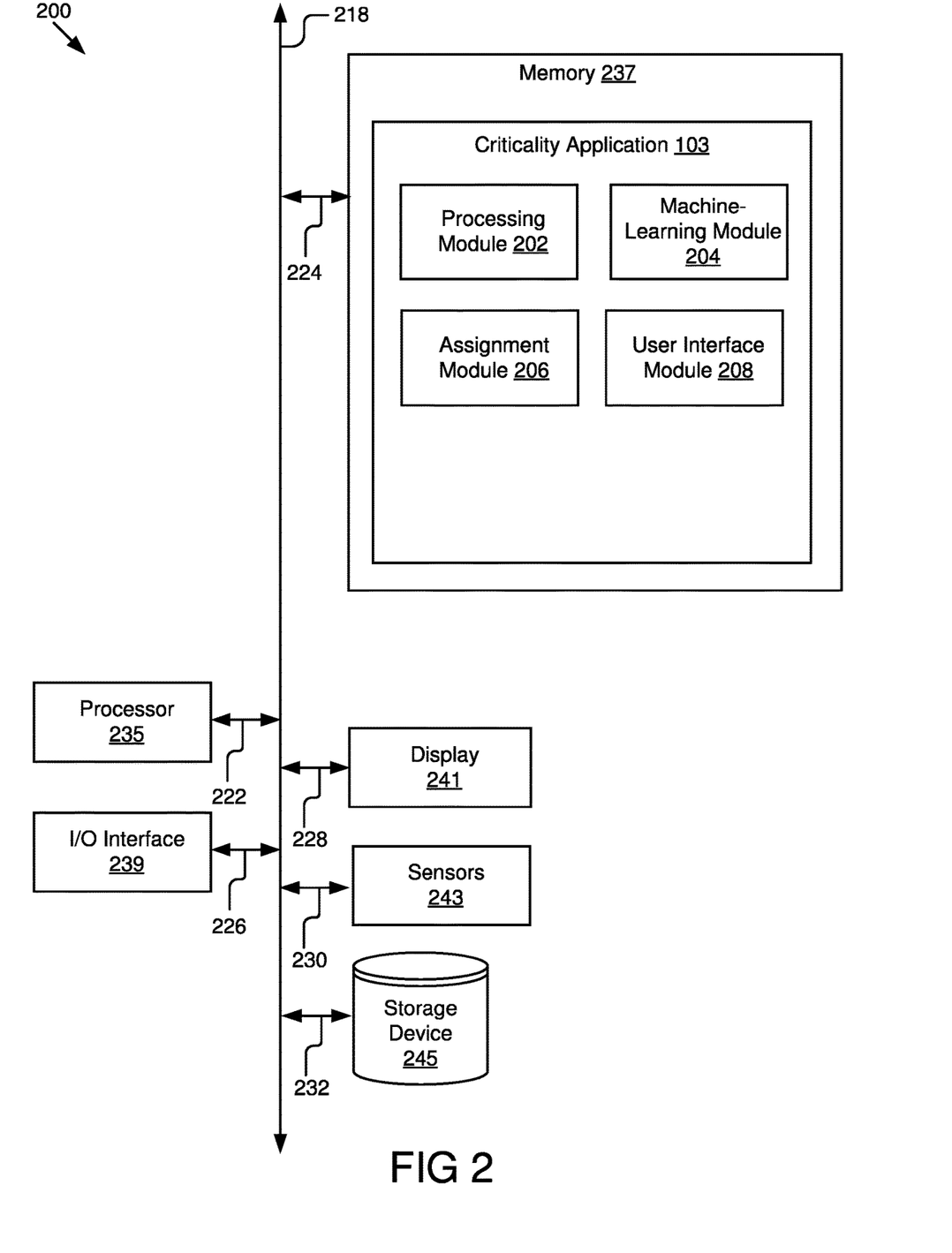
FIG. 2 is a block diagram of an example computing device, according to some embodiments described herein.

FIG. 2 is a block diagram of an example computing device 200 that may be used to implement one or more features described herein. Computing device 200 can be any suitable computer system, server, or other electronic or hardware device. In some embodiments, computing device 200 is the server 101. In some embodiments, computing device 200 is the user device 115.

In some embodiments, computing device 200 includes a processor 235, a memory 237, an I/O interface 239, a display 241, sensors 243, and a storage device 245.

The processor 235 includes an arithmetic logic unit, a microprocessor, a general-purpose controller, or some other processor array to perform computations and provide instructions to a display device. Processor 235 processes data and may include various computing architectures including a complex instruction set computer (CISC) architecture, a reduced instruction set computer (RISC) architecture, or an architecture implementing a combination of instruction sets. Although FIG. 2 illustrates a single processor 235, multiple processors 235 may be included. In different embodiments, processor 235 may be a single-core processor or a multicore processor. Other processors (e.g., graphics processing units), operating systems, sensors, displays, and/or physical configurations may be part of the computing device 200. The processor 235 is coupled to the bus 218 for communication with the other components via signal line 222.

The memory 237 may be a computer-readable media that stores instructions that may be executed by the processor 235 and/or data. The instructions may include code and/or routines for performing the techniques described herein. The memory 237 may be a dynamic random access memory (DRAM) device, a static RAM, or some other memory device. In some embodiments, the memory 237 also includes a non-volatile memory, such as a static random access memory (SRAM) device or flash memory, or similar permanent storage device and media including a hard disk drive, a compact disc read only memory (CD-ROM) device, a DVD-ROM device, a DVD-RAM device, a DVD-RW device, a flash memory device, or some other mass storage device for storing information on a more permanent basis. The memory 237 includes code and routines operable to execute the criticality application 103, which is described in greater detail below. The memory 237 is coupled to the bus 218 for communication with the other components via signal line 224.

The I/O interface 239 can provide functions to enable interfacing the computing device 200 with other systems and devices. Interfaced devices can be included as part of the computing device 200 or can be separate and communicate with the computing device 200. For example, network communication devices, storage devices (e.g., memory 237 and/or storage device 245), and input/output devices can communicate via the I/O interface 239. In another example, the I/O interface 239 can receive data, such as an input dataset, from an enterprise environment 102 and deliver the data to the criticality application 103 and components of the criticality application 103, such as the processing module 202. In some embodiments, the I/O interface 239 can connect to interface devices such as input devices (keyboard, pointing device, touchscreen, microphone, camera, scanner, sensors, etc.) and/or output devices (display devices, speaker devices, printers, monitors, etc.). The I/O interface 239 is coupled to the bus 218 for communication with the other components via signal line 226.

Some examples of interfaced devices that can connect to I/O interface 239 can include a display 241 that can be used to display content, e.g., an identification of a critical system within the enterprise environment. The display 241 can include any suitable display device such as a liquid crystal display (LCD), light emitting diode (LED), or plasma display screen, cathode ray tube (CRT), television, monitor, touchscreen, three-dimensional display screen, or other visual display device. The display 241 may be coupled to the bus 218 via signal line 228.

The sensors 243 may include hardware or software sensors that detect an indication of a change to one or more of the computer systems in the enterprise environment. In some embodiments, the sensors include an integrated sensor 243, a hardware-based sensor 243, a software-based sensor 243, a firewall, and/or a data loss prevention (DLP) scan. For example, the sensors 243 may detect the creation, modification, and/or deletion of files; the sensors 243 may detect data related to the users that access files in the enterprise environment 102; the sensors 243 may detect data related to computer hardware associated with different users in the enterprise environment 102; network sensors 243; sensors 243 in cloud-based applications; sensors 243 in a human resources system that track a job title and role of users in the enterprise environment; etc. In some embodiments, the indication includes changes to at least one parameter of the one or more computer systems. Sensors 243 may be coupled to bus 220 via signal line 230.

The storage device 245 stores data related to the criticality application 103. For example, the storage device 245 may store data associated with the criticality application 103, such as training data, enterprise environment information, user feedback, sensor data, administrator assignments and resulting feedback. In embodiments where the criticality application 103 is part of the server 101, the storage device 245 is the same as the database 199 in FIG. 1. The storage device 245 may be coupled to the bus 218 via signal line 232.

In some embodiments, components of the computing device 200 may not be present depending on the type of computing device 200. For example, if the computing device 200 is a server 101, the computing device 200 may not include the display 241.

Example Criticality Application 103

FIG. 2 illustrates a computing device 200 that executes an example criticality application 103 stored in the memory 237 that includes a processing module 202, a machine-learning module 204, an assignment module 206, and a user interface module 208. Although the modules are illustrated as being part of the same criticality application 103, persons of ordinary skill in the art will recognize that the modules may be implemented by different entities in the network environment 100. For example, the criticality application 103a on the server 101 may implement the processing module 202, the machine-learning module 204, and the assignment module 206 while the criticality application 103b on the user device 115a may implement the user interface module 208.

The processing module 202 may process data that is part of the training data for training the machine-learning model and data that is input for the machine-learning model. In some embodiments, the processing module 202 includes a set of instructions executable by the processor 235 to process data. In some embodiments, the processing module 202 is stored in the memory 237 of the computing device 200 and can be accessible and executable by the processor 235.

In some embodiments, the processing module 202 obtains a training dataset with parameters that describe training computer systems that include a set of training critical systems and a set of training non-critical systems. No computer system is in both the set of training critical systems and the set of training non-critical systems.

In some embodiments, the processing module 202 receives a training dataset that is built using heuristics or supervised learning. For example, the processing module 202 may receive a set of rules for a dataset that defines what constitutes a critical system or a non-critical system. In another example, an administrator may review different computer systems and assign a label to each of the computer systems in the training dataset that identifies each computer system as a critical system or a non-critical system.

In some embodiments, the parameters include network exposure. Network exposure may be based on whether a corresponding system has communicated with a public network, if the corresponding system only communicates with an internal network, if the corresponding system has no network capabilities, if the corresponding system is a DeMilitarized Zone (DMZ) that acts as an exposed point to untrusted networks to add an extra layer of network security to protect an internal network, if the corresponding system is a data center, etc. For example, if a system remains on an internal network, the chances of being infiltrated by malware are much lower than if the system communicates with a public network. In some embodiments, network exposure also includes a history of network connectivity. For example, the processing module 202 may obtain network exposure attributes for the enterprise environment that identify a device that communicates over HyperText Transfer Protocol (HTTP) to a Salesforce website, a device that has historic communication with a Software as a Service (SaaS) application, a device that forms a new communication, a device that uses a web application to access financial information, etc.

In some embodiments, the parameters include a type of data stored in the one or more systems of the set of critical systems and one or more systems of the set of non-critical systems. The types of data may include financial information, medical records, user names, social security numbers, documents related to mergers and acquisitions, Personally Identifiable Information (PII). In some embodiments, the processing module 202 receives types of data from a Data Loss Prevention (DLP) software. DLP software classifies regulated, confidential, and business critical information and identifies violations of policies. For example, the DLP software may identify information that is a strong indicator that a new device is a critical system because the new device receives sensitive documents.

In some embodiments, the parameters include information about users that have access to the set of critical systems and the set of non-critical systems. In some embodiments, the processing module 202 receives an identification of permissions associated with users (e.g., whether a user has administrative authority), a job title/position in an organization (e.g., Chief Executive Officer (CEO), board of directors, etc.), a job description, etc. In some embodiments, the information about users is received by the processing module 202 from a Human Resources (HR) database that is part of an enterprise environment 102 or a third-party database.

In some embodiments, the parameters include a presence or absence of files stored in the set of critical systems and the set of non-critical systems. The processing module 202 may identify a name of a file and a list of users that have access to the file. For example, a file saved on a device that is entitled "Profit/Loss 2022" that is accessible by the CEO and Chief Finance Officer (CFO), may indicate that the device is critical.

In some embodiments, the parameters include a job function of a user account. In some embodiments, the processing module 202 determines the job function of the user account based on information from an access control database. The access control database may generate and maintain an access control list (ACL), which assigns different levels of access to files and information to people in an organization. For example, an HR department may maintain an ACL with a list of job titles, job functions, and social security numbers for each user in the enterprise environment 102.

In some embodiments, each particular computer system in the training dataset is associated with a label that identifies the particular computer system as a critical system or a non-critical system. In some embodiments, the label is manually added by an administrator that reviews the different computer systems and adds the label to each computer system. In some embodiments, the label is also associated with a confidence score. For example, a particular computer system may be identified as 95% certain to be a non-critical system.

In some embodiments, the processing module 202 receives an input dataset that describes computer systems in an enterprise environment 102. For example, the input dataset may include different features of each of the computer systems, such as a history of network exposure, a type of data stored in each of the computer systems, information about the users that access each of the computer systems, and information about the files stored in each of the computer systems. In some embodiments, the input dataset includes information about any changes to a network exposure, a change to a type of data stored in the enterprise environment, or a change to a user that has access to the enterprise environment 102.

In some embodiments, the processing module 202 supplements the input dataset with additional information. For example, the processing module 202 may provide a model/make number for each computer system as part of a query to obtain the replacement cost, device type, and hardware characteristics of the computer system from a third-party website that sells computer systems.

In some embodiments, the processing module 202 receives, from one or more sensors, an indication of a change to one or more of the computer systems in the enterprise environment 102. The change may be for at least one of the above-described parameters of the computer system. For example, the processing module 202 may receive, from a sensor that monitors an ACL that is part of the HR department, that a job title of one of the users changed due to a promotion that may indicate that the user has a more critical job function as a result of the promotion. The processing module 202 may receive the indication from a sensor 243 stored on the computing device 200, such as a DLP scan that is run on all incoming information that is received by the server 101, or a sensor that is associated with the enterprise environment 102, such as directly from a firewall 10 that is running within the enterprise environment 102.

In some embodiments, the processing module 202 provides the training dataset and the input dataset to the machine-learning module 204. In some embodiments, the processing module 202 provides information to the machine-learning module 204 as it becomes available. For example, the processing module 202 may provide information from sensors as the information becomes available.

The machine-learning module 204 trains a machine-learning model (or multiple models) to output an identification of one or more critical systems and one or more non-critical systems within an enterprise environment 102. In some embodiments, the machine-learning module 204 includes a set of instructions executable by the processor 235 to train a machine-learning model to output the identification of critical and non-critical systems. In some embodiments, the machine-learning module 204 is stored in the memory 237 of the computing device 200 and can be accessible and executable by the processor 235.

In some embodiments, the machine-learning module 204 obtains a training dataset with parameters that describe training computer systems that include a set of training critical systems and a set of training non-critical systems. No computer systems that are part of the training dataset are part of both the set of training critical systems and the set of training non-critical systems. In some embodiments, the training dataset with parameters are received from the processing module 202 and the parameters may include network exposure, a type of data stored in one or more systems of the set of critical systems and the set of non-critical systems, and files stored in the set of training critical systems and the set of training non-critical systems. Additional details of the parameters are described in greater detail above with reference to the processing module 202.

The machine-learning module 204 trains a machine-learning model using the training dataset. Because the training dataset distinguishes between training critical systems and training non-critical systems, the machine-learning module 204 trains the machine-learning model to classify a particular computer system as critical or non-critical e.g., using the distinctions between critical and non-critical systems as labels.

In some embodiments, the machine-learning module 204 may train the machine-learning model using feedback where an administrator adjusts or modifies a subset of the training dataset or an input dataset that describes computer systems in an enterprise environment 102. The machine-learning module 204 may output an identification of critical systems and an identification of non-critical systems. The administrator may review the output and provide feedback that modifies the output. For example, the administrator may change the identification of a critical system to a non-critical system. In some embodiments, the machine-learning module 204 undergoes retraining sessions where an administrator reviews the output a predetermined amount of times or until the machine-learning model outputs indications that are not corrected by the administrator a predetermined threshold percentage. For example, the machine-learning module may undergo five retraining sessions or until the output is confirmed 70% of the time by an administrator.

In some embodiments, the machine-learning module 204 may train the machine-learning module based on output that identifies an initial category for one or more of the parameters. For example, the machine-learning model may assign a document the category of a finance document, a server a category of a legal server, etc. In some embodiments, the administrator adjusts or modifies one or more of the initial categories. For example, the administrator may change the category of finance document to engineering document. In another example, the machine-learning module 204 may revise the parameters for the machine-learning model based on the feedback.

In some embodiments, the machine-learning module 204 generates clusters for each parameter based on similarity of the data. For example, a jump box is a secure computer that all administrators connect to before launching any administrative task. In one example, the machine-learning module 204 may generate a cluster of the names given to jump boxes and an association that may be apparent from the clustering is that the jump boxes that are identified as being with critical systems have variations of the name "jump box 1, 2, 3."

In some embodiments, a machine-learning module 204 generates, based on information from an access control database, clusters of job functions of user accounts and their access to computer systems. For example, the machine-learning module 204, receives input about how a user that frequently has video conferences with external customers and looks up data on a sales website is a sales representative. In another example, the machine-learning module 204 receives input about a user that compiles code and works with engineering components that is an engineer. In another example, the machine-learning module 204 may create a cluster based on what users have particular privileges, such as when a security operations team is granted particular privileges after high severity detections have been generated.

Once the machine-learning module 204 trains the machine-learning model, the trained machine-learning model receives an input dataset that describes computer systems in an enterprise environment 102 from the processing module 202. The input dataset may include different parameters for the computer systems. For example, one computer system may store personally identifiable information (PII) data, accesses the internet, and is valued at $2 million.

The trained machine-learning model outputs an identification of critical systems and non-critical systems within the enterprise environment 102. For example, the trained machine-learning model may compare a feature that is part of the input dataset to a corresponding cluster to output a similarity between the feature and the cluster for a critical system or a non-critical system. The trained machine-learning model may output the identification based on multiple parameters. For example, the trained machine-learning model may output an identification that the computer system mentioned above is a critical system because having PII data, accessing the internet, and having a value of $2 million are all features that are correlated with a critical system.

In some embodiments, the trained machine-learning model outputs a confidence level for each identification of a critical system or a non-critical system. For example, the trained machine-learning model may output a confidence level that indicates that a computer system is being 65% likely to be a critical system. In some embodiments, the assignment module 206 assigns an identification of a critical system or a non-critical system when the confidence level falls below a predetermined threshold. For example, any output with a confidence level of 55% or lower is automatically reviewed by an administrator.

The trained machine-learning model may continually generate new output responsive to the machine-learning module 204 modifying parameters of the trained machine-learning model to change a critical system to a non-critical system, change a confidence level for a determination, change a category for a computer system, etc. In some embodiments, the trained machine-learning model generates new output based on changes to parameters.

In some embodiments, the trained machine-learning model receives an indication of a change to a computer system in the enterprise environment 102 that was generated by a sensor. The indication of a change may include a change to a parameter of the computer system. For example, a software-based sensor may identify that a user upgraded their device from a $1,000 computer system to a $10,000 computer system, which may cause the trained machine-learning model to reclassify the indication of a non-critical system to a critical system. In another example, an administrator may change an output from non-critical to critical and the machine-learning module 204 may modify the parameters of the trained machine-learning model based on the revision.

In some embodiments, the machine-learning module 204 receives feedback that includes a reclassification of a non-critical system to a reclassified critical system or a reclassification of a critical system to a reclassified non-critical system. The machine-learning module 204 may update the trained machine-learning model based on the feedback. Alternatively, the machine-learning module 204 may determine a reliability of the feedback based on a level of match between the feedback and other feedback received by the machine-learning module 204. For example, if a first administrator changes an indication of a non-critical system to a critical system, but 85% of the feedback from other administrators confirmed that the indication of the non-critical system was correct, the machine-learning module 204 may not update the trained machine-learning model based on the feedback from the first administrator and/or may discard the feedback from the first administrator. As a result of this process, the machine-learning module 204 may advantageously prevent someone from poisoning the system either intentionally or through incompetence or inexperience.

In some embodiments, after receiving feedback from an administrator, the machine-learning module 204 compares a confidence level associated with the indication to a threshold level and if the confidence level exceeds the threshold level, the machine-learning module 204 instructs the user interface module 208 to generate, for the administrator, a notification that includes the confidence level and requests confirmation of the reclassified critical system of the one or more non-critical systems. If the administrator provides a confirmation, in some embodiments, the machine-learning module 204 assigns a weight to the feedback to adjust an effect of the feedback, for example, by reducing or increasing the effect of the feedback.

In some embodiments, the machine-learning module 204 identifies an accuracy of the trained machine-learning model based on the feedback. In some embodiments, the trained machine-learning model outputs the confidence level in part based on an amount of feedback that corrects output from the trained machine-learning model. For example, a first indication of a critical system that is corrected through feedback 10 times may have a confidence level that is higher than a second indication of a critical system that is corrected 1000 times.

Figure 3:
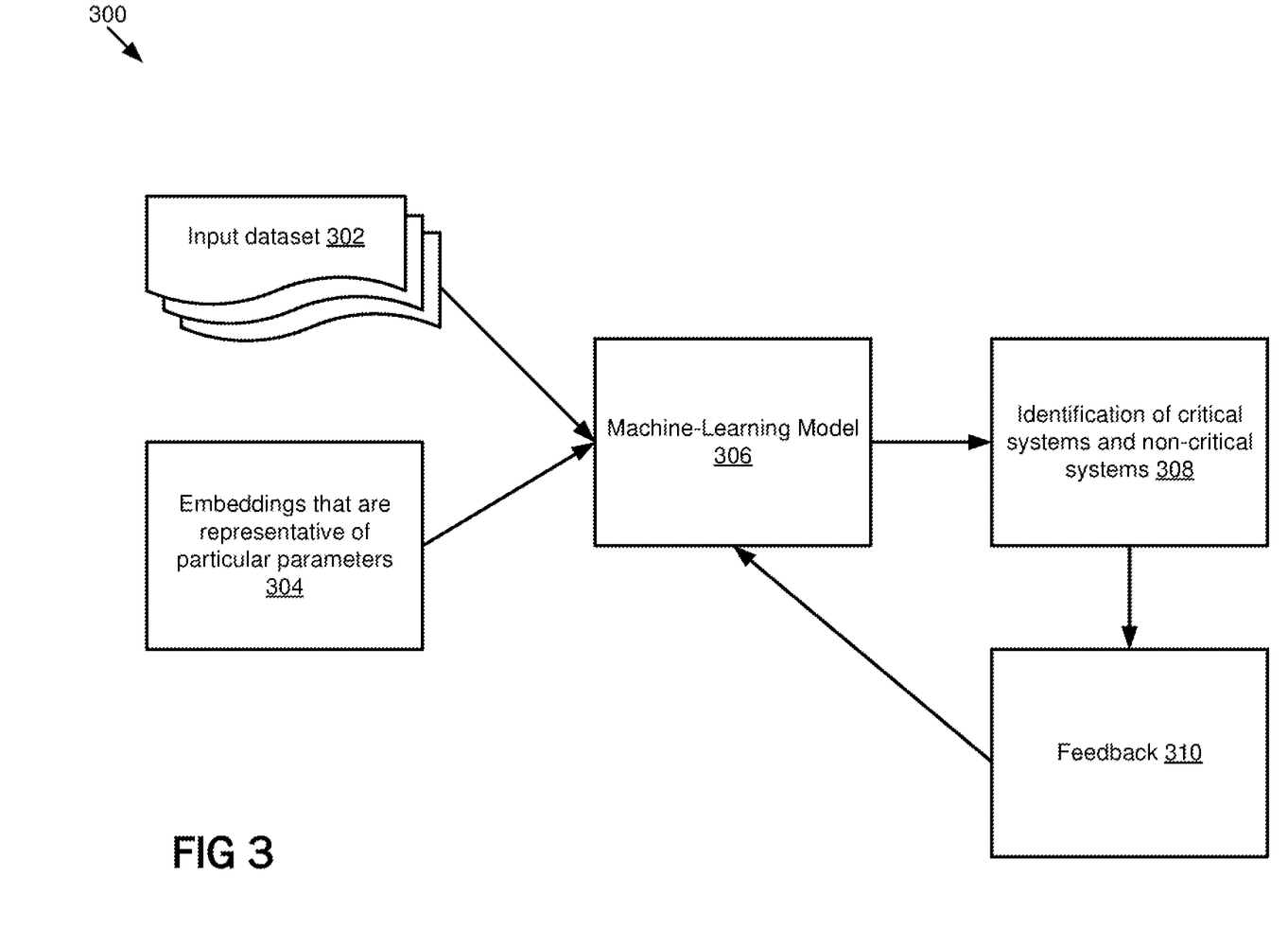
FIG. 3 is a block diagram of an example machine-learning model, according to some embodiments described herein.

FIG. 3 is a block diagram of an example 300 machine-learning model 306, according to some embodiments described herein. In some embodiments, the machine-learning model 306 includes a neural network or a decision tree. Examples of machine-learning models 306 include a Convolutional Neural Network (CNN), a Long Short Term Memory Network (LSTM), a Recurrent Neural Network (RNN), a Generative Adversarial Network (GAN), a Radial Basis Function Network (RBFN), a Multilayer Perceptron (MLP), a Self-Organizing Map (SOM), a Deep Belief Network (DBN), a Restricted Boltzmann Machine (RBM), an Autoencoder, a naïve Bayesian model, etc.

One or more input datasets 302 are provided as input to the machine-learning model 306. For example, the input datasets 302 describe features of computer systems in an enterprise environment 102, such as a number of computing systems, a history of network exposure associated with each of the computing systems, whether a computer system is primary used to store excel spreadsheets with finance information, a name of each of the computer systems, user information including a title of the user and a corresponding job function for the title, etc.

In some embodiments, embeddings 304 that are representative of particular parameters may be provided as input to the machine-learning model 306. For example, the one or more embeddings may be low-dimensional, learned vector representations that are representative of one or more parameters or types of parameters, such as network exposure, a type of data stored in one or more systems, information about users that have access to the computer systems, files stored in the computer systems, sensor information, etc. The one or more embeddings may be learned using a neural network or another type of machine-learning model that is trained to perform a particular task. For example, an embedding may categorize a computer system as critical or non-critical based on a particular parameter, such as whether the computer system has recently increased its level of network exposure. The one or more embeddings may be modified by weights. For example, a computer system's value may be more indicative of criticality than whether the user of the computer system has access to PII information. Embeddings may be learned by minimizing a loss function for the particular parameter.

The machine-learning model 306 generates as output an identification 308 of critical systems of the computer systems within the enterprise environment 102 and an identification of non-critical systems of the computer systems within the enterprise environment 102. In some embodiments, wherein each identification is associated with a corresponding confidence level.

In some embodiments, the machine-learning model 306 receives feedback 310 based on the identification 308 of critical systems and non-critical systems. The feedback 310 may include a reclassification of a non-critical system to a reclassified critical system or a reclassification of a critical system to a non-critical system.

The machine-learning model 306 is updated based on the feedback 310. The feedback 310 may be provided by one or more administrators. In some embodiments, a predetermined number of administrators provide a predetermined amount of feedback before the machine-learning model 306 is updated. In some embodiments, the machine-learning model 306 is updated responsive to a predetermined amount of feedback and based on the confidence level. For example, if the machine-learning model 306 generated output that indicates that a computer system has a 55% chance of being a critical system, it may take fewer pieces of feedback to change the indication than if the computer system has an 85% chance of being a critical system.

The assignment module 206 assigns tasks to administrators for review. In some embodiments, the assignment module 206 includes a set of instructions executable by the processor 235 to assign the tasks to the administrators for review. In some embodiments, the assignment module 206 is stored in the memory 237 of the computing device 200 and can be accessible and executable by the processor 235.

In some embodiments, the assignment module 206 assigns indications of critical systems and non-critical systems in an enterprise environment 102 to an administrator for review. For example, the assignment module 206 may generate an assignment each time a classification is assigned to a particular system or when one or more predetermined conditions are met, such as when a predetermined time period has expired. The assignment module 206 may determine that each indication needs to be reviewed a predetermined amount of time. For example, the assignment module 206 may assign an indication of a critical system with a 50% confidence rate to be reviewed 150 times as compared to an indication of a critical system with an 80% confidence rate that is assigned to be reviewed 50 times.

In some embodiments, the assignment module 206 assigns additional outputs to an administrator for review. For example, the assignment module 206 may assign indications of critical systems and non-critical systems, corresponding confidence levels, and corresponding categorizations of computer systems to an administrator for review.

In some embodiments, the assignment module 206 may determine to remove a particular administrator from reviewing indications of critical systems and non-critical systems for a particular enterprise environment 102 based on a quality of their feedback. The assignment module 206 may identify the quality of the feedback based on an agreement between feedback from a first administrator as compared to feedback from other administrators. For example, if the first administrator contradicts the feedback from other administrators 70% of the time, the assignment module 206 may remove the administrator or assign a weight to the feedback from the administrator that reduces the effect of the feedback.

In some embodiments, the assignment module 206 assigns more administrators to review threats of malicious attacks for critical systems than non-critical systems. In an enterprise environment where there are a finite number of administrators available and time is important in preventing damage to the enterprise environment 102 from malware, the assignment module 206 advantageously prioritizes resources for minimizing the threats to critical systems.

The user interface module 208 generates a user interface. In some embodiments, the user interface module 208 includes a set of instructions executable by the processor 235 to generate the user interface. In some embodiments, the user interface module 208 is stored in the memory 237 of the computing device 200 and can be accessible and executable by the processor 235.

The user interface module 208 generates graphical data that is displayed by the display 241. The user interface may be displayed on a computing device as part of the criticality application 103, as a website, or as another graphical interface, and may generally provide an interface for user interaction with the assignment module 206, e.g., for reviewing assignments for reviewing identifications of critical systems of computer systems within an enterprise environment and identifications of non-critical systems of computer systems within the enterprise environment. In some embodiments, the user interface module 208 generates a user interface for an administrator to submit approval or disapproval of the identifications. In some embodiments, the user interface module 208 may receive an instruction from the machine-learning module 204 to display a notification that includes the confidence level of the identification and requests confirmation of the reclassified critical system.

In some embodiments, the user interface module 208 generates a user interface for generating a training dataset. For example, the user interface may include a training dataset that describes different parameters in an enterprise environment and an option to assign a label to each computer system identifying it as a critical system or a non-critical system. In some embodiments, the user interface module 208 generates a user interface that allows an administrator to provide feedback by reviewing output from the machine-learning module 204 each time a classification is assigned to a particular computer system or when one or more predetermined conditions are met, such as when a predetermined time period has expired.

Example Method

Figure 4:
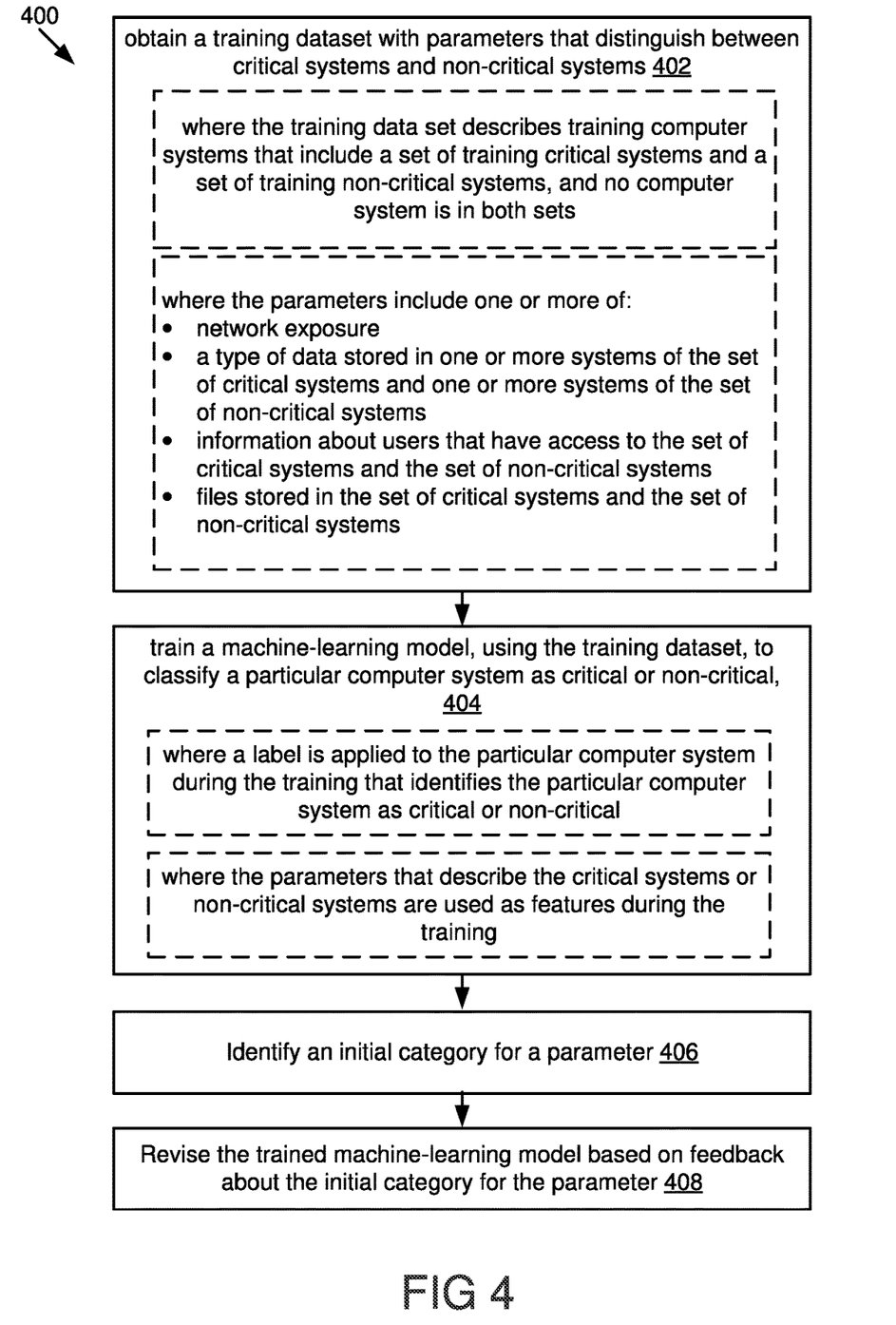
FIG. 4 is an example flow diagram to train a machine-learning model, according to some embodiments described herein.

FIG. 4 is an example flow diagram to train a machine-learning model, according to some embodiments described therein. The method illustrated in flowchart 400 is performed by a computing device 200 where the computing device may be user device 115, a server 101, or in part a user device 115 and in part a server 101.

The method 400 may begin at block 402. At block 402, a training dataset with parameters that distinguish between critical systems and non-critical systems is obtained. In some embodiments, the training data set describes training computer systems that include a set of training critical systems and a set of training non-critical systems, and no computer system is in both sets. In some embodiments, the parameters include one or more of network exposure, a type of data stored in one or more systems of the set of critical systems and one or more systems of the set of non-critical systems, information about users that have access to the set of critical systems and the set of non-critical systems, or files stored in the set of critical systems and the set of non-critical systems. Block 402 may be followed by block 404.

At block 404, a machine-learning model is trained using the training dataset to classify a particular computer system as critical or non-critical. In some embodiments, a label is applied to the particular computer system during the training that identifies the particular computer system as critical or non-critical. In some embodiments, parameters that describe the critical systems or non-critical systems are used as features during the training. Block 404 may be followed by block 406.

At block 406, an initial category is identified for a parameter. Block 406 may be followed by block 408.

At block 408, the trained machine-learning model is revised based on feedback about the initial category for the parameter. The feedback may be received by an administrator.

Figure 5:
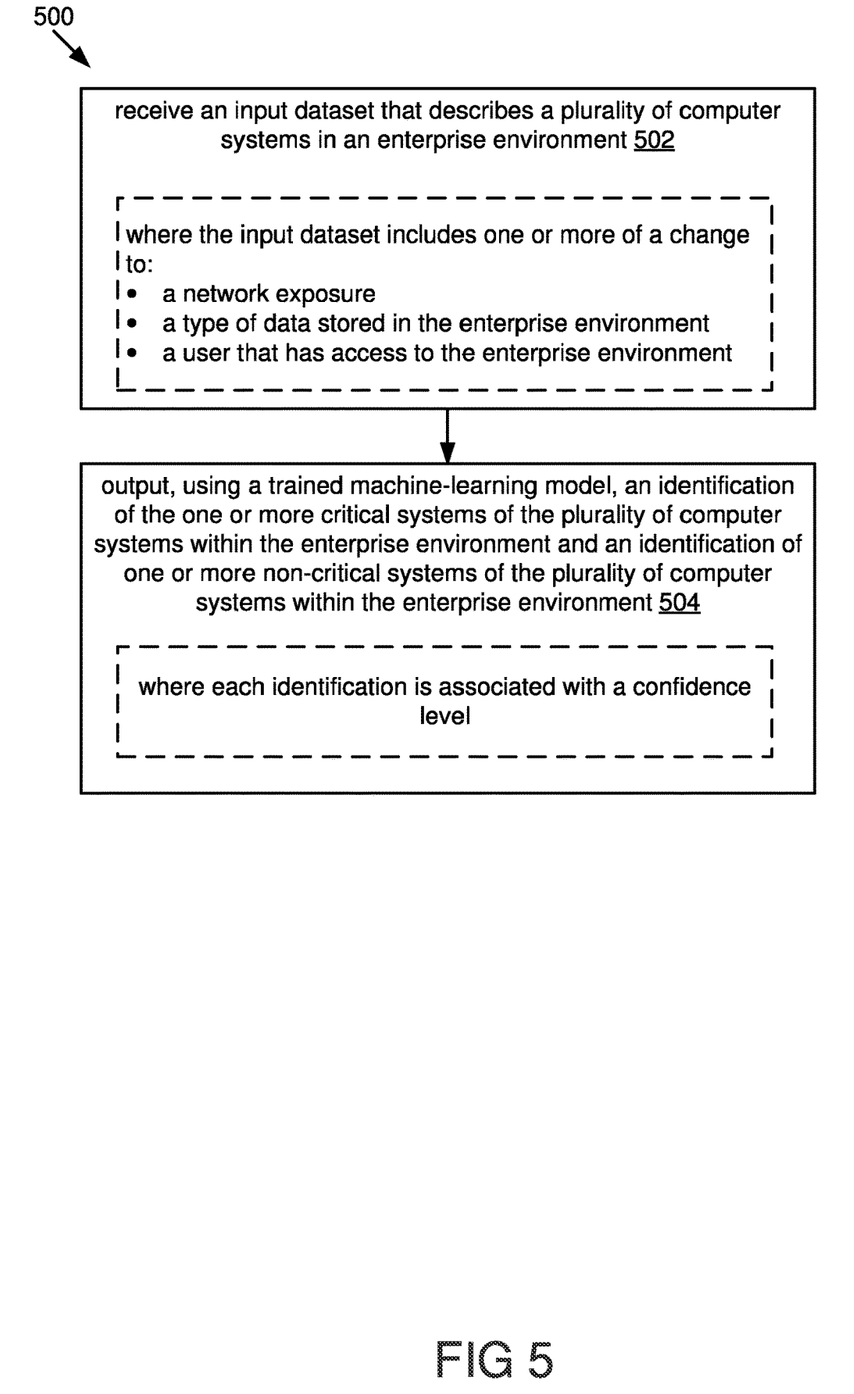
FIG. 5 is an example flow diagram that uses a machine-learning model to output an identification of one or more critical systems, according to some embodiments described herein.

FIG. 5 is an example flow diagram that uses a machine-learning model to output an identification of one or more critical systems, according to some embodiments described therein. The method illustrated in flowchart 500 is performed by a computing device 200 where the computing device may be user device 115, a server 101, or in part a user device 115 and in part a server 101.

The method 500 may begin at block 502. At block 502, an input dataset is received that describes a plurality of computer systems in an enterprise environment. In some embodiments, the input dataset includes one or more of a change to: a network exposure, a type of data stored in the enterprise environment, or a user that has access to the enterprise environment. Block 502 may be followed by block 504.

At block 504, a trained machine-learning model outputs an identification of the one or more critical systems of the plurality of computer systems within the enterprise environment and an identification of one or more non-critical systems of the plurality of computer systems within the enterprise environment. In some embodiments, each identification is associated with a confidence level.

Figure 6:
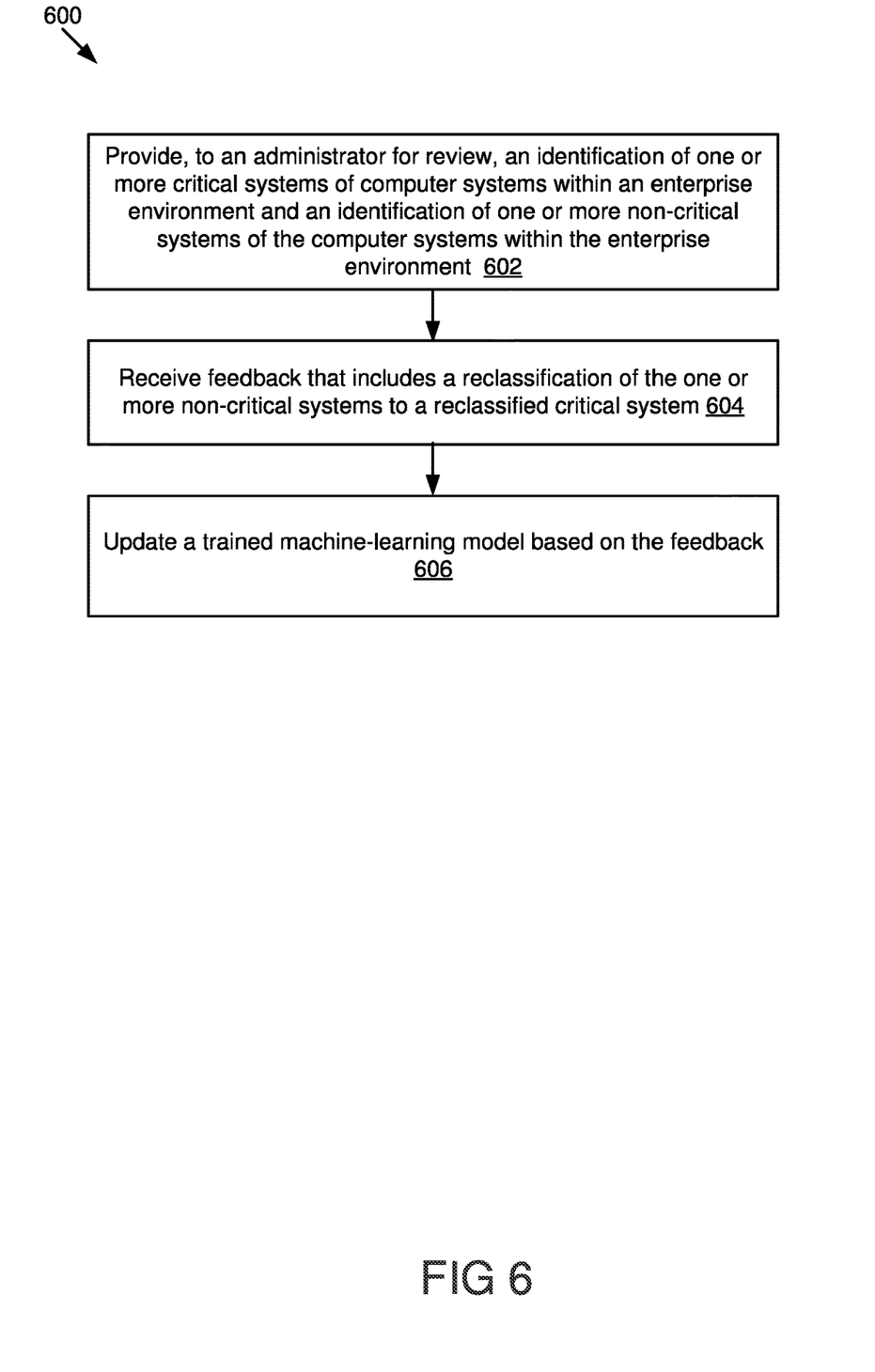
FIG. 6 is an example flow diagram that modifies a trained machine-learning model based on feedback, according to some embodiments described herein.

FIG. 6 is an example flow diagram that modifies a trained machine-learning model based on feedback, according to some embodiments described herein. The method illustrated in flowchart 600 is performed by a computing device 200 where the computing device may be user device 115, a server 101, or in part a user device 115 and in part a server 101.

At block 602, an identification of one or more critical systems of computer systems within an enterprise environment and an identification of one or more non-critical systems of the computer systems within the enterprise environment are provided to an administrator. Block 602 may be followed by block 604.

At block 604, feedback is received that includes a reclassification of the one or more non-critical systems to a reclassified critical system. Block 604 may be followed by block 606.

At block 606, a trained machine-learning model is updated based on the feedback.

Figure 7:
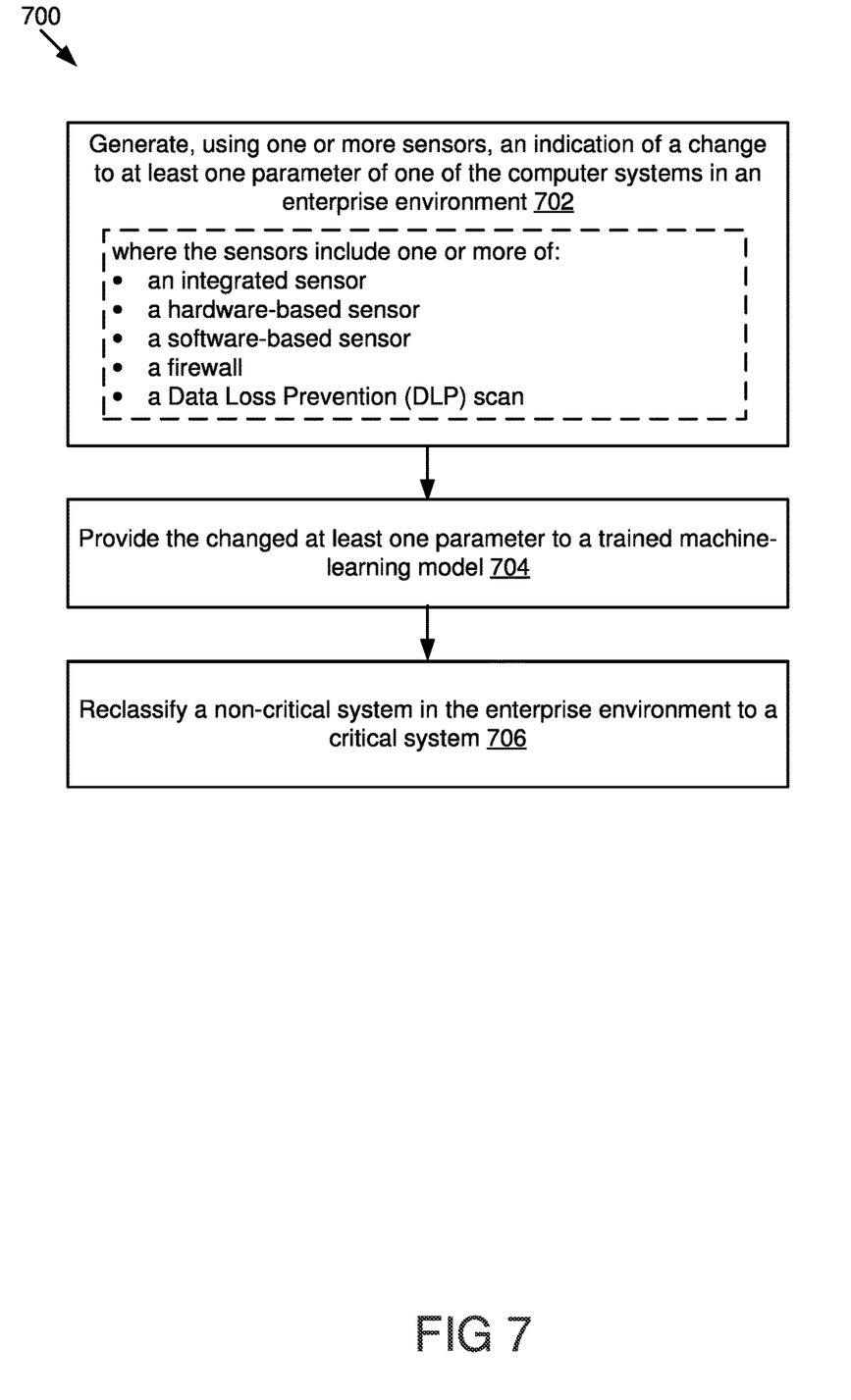
FIG. 7 is an example flow diagram that reclassifies a non-critical system to a critical system based on a change to a parameter of one of the computer systems in an enterprise environment, according to some embodiments described herein.

FIG. 7 is an example flow diagram that reclassifies a non-critical system to a critical system based on a change to a parameter of one of the computer systems in an enterprise environment, according to some embodiments described herein. The method illustrated in flowchart 700 is performed by a computing device 200 where the computing device may be user device 115, a server 101, or in part a user device 115 and in part a server 101.

At block 702, one or more sensors generate an indication of a change to at least one parameter of one of the computer systems in an enterprise environment. In some embodiments, the sensors include one or more of an integrated sensor, a hardware-based sensor, a software-based sensor, a firewall, or a Data Loss Prevention (DJLP) scan. Block 702 may be followed by block 704.

At block 704, the changed at least one parameter is provided to a trained machine-learning model. Block 704 may be followed by block 706.

At block 706, a non-critical system is reclassified in the enterprise environment to a critical system.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the embodiments can be described above primarily with reference to user interfaces and particular hardware. However, the embodiments can apply to any type of computing device that can receive data and commands, and any peripheral devices providing services.

Reference in the specification to "some embodiments" or "some instances" means that a particular feature, structure, or characteristic described in connection with the embodiments or instances can be included in at least one implementation of the description. The appearances of the phrase "in some embodiments" in various places in the specification are not necessarily all referring to the same embodiments.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic data capable of being stored, transferred, combined, compared, and otherwise manipulated. It has proven convenient at times, principally for reasons of common usage, to refer to these data as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The embodiments of the specification can also relate to a processor for performing one or more steps of the methods described above. The processor may be a special-purpose processor selectively activated or reconfigured by a computer program stored in the computer. Such a computer program may be stored in a non-transitory computer-readable storage medium, including, but not limited to, any type of disk including optical disks, ROMs, CD-ROMs, magnetic disks, RAMs, EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

What is claimed is:

1. A computer-implemented method to identify one or more critical systems within an enterprise environment, the method comprising:
training a machine-learning model, using a training dataset that distinguishes between critical systems and non-critical systems, to classify a particular computer system as critical or non-critical, wherein a label is applied to the particular computer system during the training that identifies the particular computer system as critical or non-critical, and wherein parameters that describe the critical systems or non-critical systems are used as features during the training;
receiving an input dataset that describes a plurality of computer systems in the enterprise environment;
outputting, using the trained machine-learning model, an identification of one or more critical systems of the plurality of computer systems within the enterprise environment and an identification of one or more non-critical systems of the plurality of computer systems within the enterprise environment, wherein each identification is associated with a confidence level;

receiving feedback from a first administrator that includes a reclassification of a non-critical system to a reclassified critical system;

responsive to receiving the feedback, determining whether the confidence level associated with the reclassified critical system exceeds a threshold level;

responsive to determining that the confidence level exceeds the threshold level, generating a notification to the first administrator that includes the confidence level and requesting confirmation of the reclassified critical system; and prioritizing resources by assigning a greater number of administrators to review threats of malicious attacks on the one or more critical systems than a number of administrators assigned to review threats of malicious attacks related to the one or more non-critical systems.

2. The computer-implemented method of claim 1, further comprising:

prior to training the machine-learning model, obtaining the training dataset with parameters that describe training computer systems that include a set of training critical systems and a set of training non-critical systems, wherein no computer system is in both sets, the parameters include network exposure and one or more of:

a type of data stored in one or more systems of the set of training critical systems and one or more systems of the set of training non-critical systems, information about user accounts that have access to the set of training critical systems and the set of training non-critical systems, or files stored in the set of training critical systems and the set of training non-critical systems.

3. The computer-implemented method of claim 2, wherein the training is performed using supervised learning and the supervised learning includes training the machine-learning model to assign a category to the parameters in the training dataset.

4. The computer-implemented method of claim 1, further comprising:

updating the trained machine-learning model based on the feedback; and assigning to the administrators a predetermined number of times to review the identification of the one or more critical systems and the one or more non-critical systems based on corresponding confidence levels associated with the identification.

5. The computer-implemented method of claim 1, further comprising:

responsive to receiving the confirmation of the reclassified critical system and the first administrator contradicting the feedback from other administrators more than a predetermined number of times, discarding the feedback from the first administrator.

6. The computer-implemented method of claim 1, further comprising:

responsive to receiving the confirmation of the reclassified crucial system and the first administrator contradicting the feedback from other administrators more than a predetermined number of times, assigning a weight to the feedback from the first administrator to adjust an effect of the feedback.

7. The computer-implemented method of claim 1, further comprising:

determining a reliability of the feedback based on a level of match between the feedback and a plurality of other feedback from one or more other administrators.

8. The computer-implemented method of claim 1, further comprising:

generating, using one or more sensors, an indication of a change to at least one parameter of the plurality of computer systems in the enterprise environment; and upon generating the indication, reclassifying the one or more non-critical systems to one or more reclassified critical systems by providing the changed at least one parameter to the trained machine-learning model.

9. The computer-implemented method of claim 8, wherein the sensors include one or more of an integrated sensor, a hardware-based sensor, a software-based sensor, a firewall, or a Data Loss Prevention (DLP) scan.

10. The computer-implemented method of claim 1, wherein the parameters include network exposure that is based on whether a corresponding system has communicated with a public network.

11. The computer-implemented method of claim 1, further comprising:

determining, based on an access control database, a job function of user accounts that have access to systems, wherein the job function is a parameter for the trained machine-learning model; and generating, with the trained machine-learning model, clusters based on the job function;

wherein the identification of the one or more critical systems is based on the clusters.

12. The computer-implemented method of claim 1, wherein the input dataset includes one or more of a change to a network exposure, a change to a type of data stored in the enterprise environment, or a change to a user account that has access to the enterprise environment.

13. A system comprising:

one or more processors; and one or more computer-readable media, having instructions stored thereon that, when executed by the one or more processors, cause the one or more processors to perform operations comprising:

training a machine-learning model, using a training dataset that distinguishes between critical systems and non-critical systems, to classify a particular computer system as critical or non-critical, wherein a label is applied to the particular computer system during the training that identifies the particular computer system as critical or non-critical, and wherein parameters that describe the critical systems or non-critical systems are used as features during the training;

receiving an input dataset that describes a plurality of computer systems in an enterprise environment;

outputting, using the trained machine-learning model, an identification of one or more critical systems of the plurality of computer systems within the enterprise environment and an identification of one or more non-critical systems of the plurality of computer systems within the enterprise environment, wherein each identification is associated with a confidence level;

receiving feedback from a first administrator that includes a reclassification of a non-critical system to a reclassified critical system;

responsive to receiving the feedback, determining whether the confidence level associated with the reclassified critical system exceeds a threshold level;

responsive to determining that the confidence level exceeds the threshold level, generating a notification to the first administrator that includes the confidence level and requesting confirmation of the reclassified critical system; and prioritizing resources by assigning a greater number of administrators to review threats of malicious attacks on the one or more critical systems than a number of administrators assigned to review threats of malicious attacks related to the one or more non-critical systems.

14. The system of claim 13, wherein the operations further comprise:

prior to training the machine-learning model, obtaining the training dataset with parameters that describe training computer systems that include a set of training critical systems and a set of training non-critical systems, wherein no computer system is in both sets, the parameters include network exposure and one or more of:
- a type of data stored in one or more systems of the set of training critical systems and one or more systems of the set of training non-critical systems,
- information about user accounts that have access to the set of training critical systems and the set of training non-critical systems, or
- files stored in the set of training critical systems and the set of training non-critical systems.

15. The system of claim 14, wherein the training is performed using supervised learning and the supervised learning includes applying a category to the parameters in the training dataset.

16. A computer-program product that includes one or more non-transitory computer-readable media with instructions stored thereon that, when executed by one or more computers, cause the one or more computers to perform operations comprising:

training a machine-learning model, using a training dataset that distinguishes between critical systems and non-critical systems, to classify a particular computer system as critical or non-critical, wherein a label is applied to the particular computer system during the training that identifies the particular computer system as critical or non-critical, and wherein parameters that describe the critical systems or non-critical systems are used as features during the training;

receiving an input dataset that describes a plurality of computer systems in an enterprise environment;

outputting, using the trained machine-learning model, an identification of one or more critical systems of the plurality of computer systems within the enterprise environment and an identification of one or more non-critical systems of the plurality of computer systems within the enterprise environment, wherein each identification is associated with a confidence level;

receiving feedback from a first administrator that includes a reclassification of a non-critical system to a reclassified critical system;

responsive to receiving the feedback, determining whether the confidence level associated with the reclassified critical system exceeds a threshold level;

responsive to determining that the confidence level exceeds the threshold level, generating a notification to the first administrator that includes the confidence level and requesting confirmation of the reclassified critical system; and prioritizing resources by assigning a greater number of administrators to review threats of malicious attacks on the one or more critical systems than a number of administrators assigned to review threats of malicious attacks related to the one or more non-critical systems.

17. The computer-program product of claim 16, wherein the operations further comprise:

prior to training the machine-learning model, obtaining the training dataset with parameters that describe training computer systems that include a set of training critical systems and a set of training non-critical systems, wherein no computer system is in both sets, the parameters include network exposure and one or more of:
- a type of data stored in one or more systems of the set of training critical systems and one or more systems of the set of training non-critical systems,
- information about users that have access to the set of training critical systems and the set of training non-critical systems, or
- files stored in the set of training critical systems and the set of training non-critical systems.

18. The computer-program product of claim 17, wherein the training is performed using supervised learning and the supervised learning includes applying a category to the parameters in the training dataset.

19. The computer-program product of claim 16, wherein the operations further comprise:

assigning to the administrators a predetermined number of times to review the identification of the one or more critical systems and the one or more non-critical systems based on corresponding confidence levels associated with the identification.

20. The computer-program product of claim 16, wherein the operations further include:

responsive to receiving the confirmation of the reclassified critical system and the first administrator contradicting the feedback from other administrators more than a predetermined number of times, discarding the feedback from the first administrator.

* * * * *